United States Patent [19]

Deyrup

[11] Patent Number: 4,973,625

[45] Date of Patent: Nov. 27, 1990

[54] PLASTIC COMPOSITE BARRIER STRUCTURES

[75] Inventor: Edward J. Deyrup, North East, Md.

[73] Assignee: E. I. du Pont de Nemours and Company, Wilmington, Del.

[21] Appl. No.: 100,191

[22] PCT Filed: Nov. 6, 1986

[86] PCT No.: PCT/US86/02389

§ 371 Date: Sep. 23, 1987

§ 102(e) Date: Sep. 23, 1987

[51] Int. Cl.$^5$ .................... C08L 28/06; C08L 51/06
[52] U.S. Cl. ........................................ 525/74; 525/70; 128/36.7; 128/476.1
[58] Field of Search ............................ 525/70, 78, 74; 428/36.7, 476.1

[56] References Cited

U.S. PATENT DOCUMENTS

| | | | |
|---|---|---|---|
| 4,087,587 | 5/1978 | Shida et al. | 525/73 |
| 4,087,588 | 5/1978 | Shida et al. | 525/73 |
| 4,409,364 | 10/1983 | Schmukler et al. | 525/74 |
| 4,416,944 | 11/1983 | Adur | 428/349 |
| 4,460,632 | 7/1984 | Adur et al. | 525/74 |
| 4,481,262 | 11/1984 | Shida et al. | 428/463 |
| 4,487,885 | 12/1984 | Adur et al. | 525/74 |
| 4,510,286 | 4/1985 | Liu | 525/74 |

*Primary Examiner*—Allan M. Lieberman

[57] ABSTRACT

Composite moisture and oxygen barrier structures in the form of films, sheets, tubes and bottles are described which are composed of foils of high density polyethylene and foils of polar oxygen barrier resins adhered to each other with a coextruded bonding resin composition composed of blends of predominantly high density polyethylene containing low levels of a grafted unsaturated dicarboxylic acid anhydride and linear low density polyethylenes which are copolymers of ethylene with either octene-1 or butene-1. The preferred dicarboxylic acid anhydride is maleic anhydride. The oxygen barrier resins are preferably ethylene/vinyl alcohol copolymers or amorphous polycarboxylamides from condensation polymerization of aliphatic diamines and aromatic dicarboxylic acids.

4 Claims, No Drawings

PLASTIC COMPOSITE BARRIER STRUCTURES

BACKGROUND OF THE INVENTION

A variety of plastic composite structures have been proposed in the past in which a polar, oxygen barrier resin is adhered to a modified polyolefin resin, frequently a polyethylene resin, which has been chemically modified by grafting varying amounts of an unsaturated carboxylic acid or an unsaturated carboxylic acid anhydride, frequently a dicarboxylic acid anhydride, at various levels to the polyethylene backbone by methods known in the art. In some cases a polyethylene is bonded to a polar oxygen barrier resin with an adhesive which is a modified polyolefin containing various levels of grafted carboxylic acid or dicarboxylic acid anhydride and usually also an amorphous olefin rubber, such as ethylene-propylene diene rubbers, ethylene propylene copolymers, or linear low density polyethylenes which provide toughening and improve adhesion to polar substrates. Generally it has not been possible to obtain both good adhesion of the polyolefin resin to the polar resin and high moisture vapor barrier properties in the polyolefin resin. It is known that high density polyethylene which has a high crystallinity provides better moisture barrier properties than low density polyethylene or linear low density polyethylene or ethylene/propylene rubbers but there have been problems in obtaining adequate adhesion of high density polyethylene or modified high density polyethylene to polar oxygen barrier resins. Frequently the unsaturated carboxylic anhydride employed has been chi-methylbicyclo(2.2.1)hept-5-ene-2,3-dicarboxylic acid anhydride or maleic anhydride, but many other anhydrides have been disclosed in other patents. Illustrative of these types of composite structures known in the art are shown in U.S. Pat. No. 4,087,587, Shida et al., U.S. Pat. No. 4,198,327, Matsumoto et al., U.S. Pat. No. 4,230,830, Tanny et al., U.S. Pat. No. 4,409,364, Schmukler et al., U.S. Pat. No. 4,460,646, Inoue et al., U.S. Pat. No. 4,487,885, Adur et al., and U.S. Pat. No. 4,510,286, Liu. Most commonly, these patents disclose composite structures involving carboxylic acid grafted ethylene polymers or a carboxylic acid grafted polypropylene adhered to crystalline polycarboxylamide such as nylon-6. In some cases, adhesion to superior oxygen barrier materials such as EVOH (ethylene vinyl alcohol copolymer) are described.

U.S. Pat. No. 4,416,944, Adur describes composite structures of modified polyethylene and polypropylene adhered to oxygen barriers such as EVOH or nylon and also shows adhesion to high density polyethylene of modified polyolefin compositions comprising high density polyethylene having a density in the range of 0.94-0.97 g/cc, high density polyethylene grafted to chi-methylbicyclo(2.2.1)hept-5-ene-2,3-dicarboxylic acid anhydride at a level of 1.5 weight percent together with a polypropylene resin and a linear low density polyethylene resin having a density in the range of 0.91-0.94 g/cc. The total amount of high density polyethylene in the adhesive composition is stated to be in the range of 20-60% by weight in the examples.

U.S. Pat. No. 4,481,262, Shida et al., describes composite structures adhered to nylon-6 or ethylene vinyl alcohol copolymer in which the hydrocarbon copolymer adhered to it is a composition containing a linear low density polyethylene having carboxylic anhydride grafted to it and blended with a variety of different materials including ethylene vinyl acetate copolymer, ethylene methyl acrylate copolymer, low density polyethylene homopolymers or linear low density copolymers. In the adhesive compositions, the grafted linear low density polyethylene comprises 10% and the other materials 90% of the blend. In the examples ethylene vinyl acetate copolymer or an ethylene acrylate copolymer or an ethylene methyl acrylate copolymer are illustrated as comprising 90% of the adhesive blend but in one example a polyethylene having a density of 0.94 g/cc was substituted for these copolymers and provided some adhesion to nylon.

U.S. Pat. No. 4,460,632, Adur et al. discloses composite structures in which an adhesive polyethylene blend is adhered to substrates such as nylon, nylon-6, polyethylene or ethylene/vinyl alcohol copolymer. The adhesive compositions disclosed are blends of a medium density high pressure, free-radical polyethylene, a linear low density polyethylene and a high density polyethylene graft to a carboxylic anhydride such as chi-methylbicyclo(2.2.1)hept-3-ene-2,3-dicarboxylic anhydride or in one example maleic anhydride. In the adhesive compositions employed in these composites, linear low density polyethylene comprises from 10-90% by weight according to the generic disclosure. The examples show 10% of the grafted high density polyethylene and a total of from 10-90% of the mixture of grafted high density polyethylene and medium density polyethylene. It is shown that the grafted high density polyethylene may contain a very wide range of acid anhydride grafted to it generically stated as from 0.05-30 weight percent.

Another patent of interest is Mito et al., U.S. Pat. No. 4,370,388. This patent discloses adhesive compositions and composite structures made from them. Broadly adhesive structures are disclosed which contain from 97-50 parts by weight of a polyethylene resin having a density in the range of 0.945-0.970 grafted with a dicarboxylic acid anhydride such as maleic anhydride, 3-50 parts by weight of an ethylene/4-methyl-1-pentene copolymer having an ethylene content of 93-99.9 mole percent and 0-20 parts by weight of a rubbery synthetic polymer or copolymer. The patent broadly discloses that the amount of the grafted monomer in the grafted high density polyethylene may range from 0.001-10%, more preferably 0.02-5%. Comparative examples in which the copolymer of ethylene/4-methyl-1-pentene copolymer was replaced with an ethylene/hexene-1 copolymer or an ethylene/propylene copolymer rubber are said to be unsatisfactory. The density of the ethylene/4-methyl-1-pentene copolymer disclosed is from 0.910-0.945 g/cm$^3$ or preferably 0.920-0.93 g/cm$^3$. Primarily two layer composites are contemplated in which, in addition to the adhesive resin, nylon-6, nylon-66 and other similar crystalline nylons as well as a variety of polyesters and saponified copolymers of ethylene/vinyl acetate are contemplated. The only exemplified grafted high density polyethylene employed is one containing 2% by weight of maleic anhydride, a melt index of 7 g/10 min and a density of 0.962 g/cm$^3$.

In all of the above patents the peel strengths disclosed are substantially impossible to relate to each other because they are so dependent upon laminating conditions and unstated percentages of carboxylic anhydride grafted to a polyolefin.

Generally peel strength for coextruded composites are not shown.

SUMMARY OF THE INVENTION

The present invention is directed to coextruded composite structures in the form of foils, sheets, tubes or blown bottles and other containers which provide both excellent oxygen barrier properties and excellent moisture barrier properties. The oxygen barrier properties are provided by a polar resin selected from the group consisting of ethylene/vinyl alcohol copolymers prepared by saponification or hydrolysis of corresponding ethylene/vinyl acetate copolymers, polyvinyl alcohol, and polycarboxylamides. Moisture barrier properties are provided by a foil of high density polyethylene and by an adhesive composition consisting essentially of a blend of from 70-90 weight percent of a high density linear polyethylene having a melt index of from 0.1-8.0 g/10 min and a density in the range of from above 0.950 to 0.970 g/cm$^3$ and containing sufficient of a modified linear high density polyethylene having a density in the range of 0.950 to 0.970 g cm$^3$ and a melt index in the range of from 0.1 to 8.0 g/10 min having from 0.7-14 mole percent of an unsaturated dicarboxylic acid anhydride grafted to a portion of the high density linear polyethylene to provide from 0.245 to 1.05 mole percent of said grafted anhydride in the high density polyethylene composition and blended therewith a linear low density polyethylene selected from the group consisting of linear copolymers of ethylene with butene-1 and linear copolymers of ethylene with octene-1 having a density in the range of from 0.912–0.930 g/cm$^3$ and a melt index in the range of 0.5–6 g/10 min.

Particularly preferred oxygen barrier foils are EVOH and amorphous polycarboxylamides such as the condensation polymerization products of hexamethylenediamine and a mixture of terephthalic and isophthalic acids, most particularly a mixture of 30% by weight terephthalic with 70% by weight isophthalic acid.

Also provided by this invention is an improved melt-extrudable bonding resin composition capable of adhering nonpolar high density linear polyethylene (HDPE) in the form of foils, sheets, tubes or blown bottles or other containers to polar oxygen barrier resins in the form, respectively, of foils, sheets, tubes or blown bottles and which exhibits a combination of resistance to separation of the nonpolar high density polyethylene from the polar oxygen barrier resin and low moisture vapor transmission comparable to that of high density linear polyethylene alone in which the bonding resin composition consists essentially of a blend of from 70–90 weight percent, preferably from 80–90 weight percent of composition (i) and from 10–30 weight percent, preferably from 10–20 weight percent of composition (ii) in which composition (i) is composed of a blend of high density linear polyethylene having a melt index in the range of 0.1–8.0 g/10 min preferably in the range of from 0.8–2.5 g/10 min, and a density in the range of from 0.950–970 g/cm$^3$, preferably in the range of from 0.955–0.960 g/cm$^3$ and sufficient of a modified high density linear polyethylene having a melt index in the range of from 0.1–8.0 g/10 min, preferably in the range of from 0.8–2.5 g/10 min, and a density in the range of from 0.950–0.970 g/cm$^3$, preferably in the range of from 0.955–0.960 g/cm$^3$, having from 0.7–14 mole percent of an unsaturated dicarboxylic acid anhydride, preferably maleic anhydride, grafted to the high density linear polyethylene to provide from 0.245–1.05 mole percent of the grafted dicarboxylic acid anhydride in composition (i), and in which composition (ii) is a linear low density polyethylene (LLDPE) selected from the group consisting of linear copolymers of ethylene with butene-1 and linear copolymers of ethylene with octene-1 having a density in the range of from 0.912–0.930 g/cm$^3$, preferably in the range of 0.917–0.920 g/cm$^3$, and a melt index in the range of from 0.5–6.0 g/10 min, preferably in the range of from 1.0–2.5 g/10 min.

DESCRIPTION OF PREFERRED EMBODIMENTS

For many purposes the most satisfactory melt-extrudable bonding resin compositions of this invention consist essentially of a blend of from 80–90 weight percent of composition (i) and from 10–20 weight percent of composition (ii) in which composition (i) is composed of a blend of high density linear polyethylene having a melt index in the range of from 0.8–2.5 g/10 min and a density in the range of from 0.950–0.960 g/cm$^3$ and sufficient of a modified high density linear polyethylene having a melt index in the range of 0.8 to 6.0 g/10 min and a density in the range of from above 0.950 to 0.970 g cm$^3$ having from 0.7–14 mole percent of maleic anhydride grafted to a portion of the high density linear polyethylene to provide from 0.245–1.05 mole percent of the grafted maleic anhydride in composition (i), and in which composition (ii) is a linear low density polyethylene selected from the group consisting of linear copolymers of ethylene with butene-1 and linear copolymers of ethylene with octene-1 having a density in the range of 0.917–0.920 g/cm$^3$ and a melt index in the range of from 1.0–2.5 g/10 min.

Particularly preferred composite film structures are prepared from high density linear polyethylenes having a density in the range of 0.955–0.960 g/cm$^3$ and a melt index in the range of from about 0.8 to about 2.5 g/10 min as the moisture barrier layer and ethylene/vinyl alcohol copolymers having an ethylene content in the range of from 25 to 50 mole percent as the oxygen barrier layer and coextruded with the preferred bonding resin compositions described above between the polyethylene foil and the ethylene/vinyl alcohol copolymer foil.

Methods for preparing the high density, linear polyethylenes and linear low density polyethylenes, which are copolymers of ethylene with alpha-olefins, employed as components of the bonding resins of this invention are well known to those skilled in the art. Generally, moderately low pressures are employed using as catalyst the reaction product of a transition metal salt, usually a chloride of titanium, vanadium or zirconium or vanadium oxychloride, partially reduced with an organometallic aluminum or magnesium compound such as an aluminum alkyl compound or a Grignard reagent. These polymerizations may be conducted at temperatures above 130° C. in solution or as slurries in a diluent at lower temperatures. Methods of preparing the linear copolymers and homopolymers of ethylene employed in the bonding resins of the present invention are described inter alia respectively in Anderson et al. U.S. Pat. No. 4,026,698 and in Anderson et al. U.S. Pat. No. 2,905,645 as well as in several patents of Karl Ziegler and his associates.

Conventional low density, branched polyethylenes, prepared at high pressures using free-radical initiators and which have both very long branches and a variety of short branches, have not been found to be as satisfactory as the linear low density copolymers of ethylene with butene-1 or octene-1 as components of the bonding resins of the present invention.

The composite films of this invention can be used as such for wrapping foodstuffs or biological specimens and the like where it is desired to prevent contact with oxygen diffusing in as well as loss of moisture diffusing out, or they can be converted into bags or pouches for packaging such materials. For particular uses the composite packaging film of this invention will be composed of two to four foils of high density linear polyethylene having a polar oxygen barrier foil disposed between each high density linear polyethylene foil and adhered on both sides of each polar oxygen barrier foil to the adjacent high density linear polyethylene foil with the melt-extrudable bonding resin of the present invention. Particularly preferred composite packaging films of this invention employ an ethylene/vinyl alcohol copolymer as the oxygen barrier resin. Particularly preferred coextruded blown bottles of this invention have one wall composed of high density linear polyethylene adhered to the other wall composed of the amorphous polycarboxylamide obtained as the condensation product of hexamethylaminediamine and a mixture of terephthalic and isophthalic acids with the bonding resin of this invention coextruded between the interior and exterior walls to provide good adhesion and further resistance to the passage of moisture vapor. The blown bottles of this invention are useful for storing chemicals which are sensitive to both moisture vapor and oxygen in view of the good barrier resistance to those gases provided by the composite wall structure of the present invention.

As is evident from the above description, the composites of this invention can be used to manufacture packaging films which can be used as such or converted into bags or pouches. They can also be coextruded in the form of tubes for conveying liquids or gases where it is desired to prevent contamination with both moisture vapor and oxygen.

The melt-extrudable bonding resin compositions employed in the composite structures of this invention may conveniently be prepared by dry blending of the ingredients followed by melt blending preferably in an extruder where the melt exiting the extruder is quenched in water and cut into pellets. Generally these compositions will contain a small amount of the order of 0.1% by weight of an antioxidant, preferably a hindered phenolic antioxidant.

The preparation of grafts of the unsaturated dicarboxylic acid anhydrides on the high density linear polyethylene ingredient of the composition can be accomplished by methods known to those familiar with the art which consist of heating a mixture of the high density polyethylene and the unsaturated dicarboxylic anhydride in the presence of air, hydroperoxides or other free radical initiators. Most suitable are the methods described in U.S. Pat. No. 4,612,155. A convenient method for accomplishing the grafting reaction is to first premix the dry ingredients and then extrude the mixture through a heated extruder, cutting up the extrudate to provide molding pellets. However, other well known mixing means such as a Brabender mixer, a Banbury mixer, roll mills or the like may also be employed to produce the unsaturated dicarboxylic acid anhydride grafted to the polyethylene chains.

While maleic anhydride is the preferred unsaturated dicarboxylic acid anhydride employed in preparing the melt extrudable bonding resins used in composite structures of this invention many other unsaturated dicarboxylic acid anhydrides are known to persons familiar to this art which will graft in a similar fashion and provide similar adhesive properties. Particularly useful such unsaturated dicarboxylic acid anhydrides include chimethylbicyclo(2.2.1)hept-5-ene-2,3-dicarboxylic acid anhydride and bicyclo(2.2.1)hept-5-ene-2,3-dicarboxylic acid anhydride. It is also known that carboxylic acids which readily form anhydrides under grafting conditions such as maleic acid and fumeric acid can be used to produce such grafts with polyethylene.

The coextruded laminated multilayer composite structures of this invention can be produced by various means as known to those skilled in this art. For example, such structures can be produced by melting the individual components in separate extruders and coextruding them through a single coextrusion die fed with the separate molten components from the individual extruders. The temperature of the bonding resin composition during the coextrusion can be in the range of 130.C to 300° C. but is preferably in the range of about 150° C to 250° C. The temperature of the polar barrier resin must be above its softening temperature but below the temperature where rapid decomposition may occur. For EVOH (the saponified copolymers of ethylene with vinyl acetate referred to herein as ethylene/vinyl alcohol copolymer), the temperature should be in the range of 170° C. to 260° C., preferably between 180° and 240° C. during coextrusion. For amorphous polycarboxylamides produced from aliphatic diamines and aromatic dicarboxylic acids, the temperature during coextrusion should be above their glass transition temperatures, which are below 170° C., preferably in the range of 170° to 250° C. The molten HDPE resin should be at a temperature in the range of about 150° C. to 250° C. during coextrusion.

The thicknesses of the various layers in composite films will vary according to the intended application. The adhesive bonding resin composition can vary from 0.00254 to 0.254 mm but most typically will have a thickness in the range from 0.013 to 0.076 mm. The polar oxygen barrier resin can vary in thickness from 0.0025 to 0.25 mm but most typically the thickness will be in the range from 0.025 to 0.076 mm. The HDPE mOisture vapor barrier layer can be in the range from 0.10 to 0.25 mm, most typically in the range from 0.11 to 0.17 mm. In the case of coextruded composite sheets or tubing and blown bottles, thicker HDPE and polar oxygen barrier layers generally are preferred in order to provide greater structural rigidity and greater moisture and oxygen barrier properties.

When designing composite structures of this invention for particular applications, the following Table A will be useful as a guide in determining the thicknesses of each layer needed to provide the required moisture vapor and oxygen barrier properties of the composite structures.

TABLE A

| Material | MVT* | $O_2$ TR (20° C., DRY)** | $O_2$ TR (35° C., 80% RH)** |
|---|---|---|---|
| Amorphous polycarboxylamide 70/30 6I/6T*** | 0.4 | 2.5 | 1.2 |
| nylon 6 | 8.0 | 3.6 | 7.0 |
| EVOH | 0.7–2.1 | 0.005–0.02 | 0.35 |
| HDPE | 0.12 | 48 | |
| LLDPE | 0.27 | | |

*(g × mm/M²/24 hr)
**cc-mil/100 in²-day-atm
***polycarboxylamide from hexamethylenediamine and a mixture of 70% isophthalic and 30% terephthalic acids Various combinations of layers of (A) HDPE, (B) bonding resin and (C) 02 barrier resin can be provided by the composite structures of this invention. Examples are A/B/C, A/B/C/B/C/B/A, A/B/C/B/A/B/C/B/A, A/B/C/B/A/B/C, C/B/A/B/C, A/B/C/B/A, etc. Generally, if the composite structure will be used in the presence of an atmosphere containing moisture, the $O_2$-barrier layer should be protected on both sides with HDPE layers in cases where moisture reduces significantly the $O_2$-barrier properties of the polar resin as shown for EVOH in Table A. Also within the composite structures of this invention are those which can be represented as HDPE/CXA/oxygen barrier resin (e.g., EVOH) and composite structures which can be represented by HDPE/CXA/EVOH/CXA/EVA or regrind/HDPE in which CXA represents the bonding resin. In the latter, EVA(ethylene/vinyl acetate copolymer) or regrind (ground scrap composite film containing HDPE, CXA, and EVOH) provides adhesion to the outer HDPE layer as well as adhering to the CXA.

Unless otherwise stated, melt index values for the homopolymers and copolymers described were determined by the procedure of ASTM D-1238, Condition E. The melt index of the polymers is controlled by the temperature of polymerization as well as by the use of telogens such as hydrogen, as is well known to those skilled in the art.

The density values for the homopolymers and copolymers described were determined by the procedure of ASTM D-1505 on compression molded films. The densities, and crystallinities corresponding thereto, of the linear low density polyethylenes are controlled by the weight percent of comonomer copolymerized with ethylene, as is well known to those skilled in the art.

EXAMPLES

In the following Examples and Comparative Examples the following abbreviations are used:

HDPEA represents a high density linear polyethylene having a density of 0.960 g/cm³ and a melt index of 1.5 g/10 min.

HDPEB represents a high density linear polyethylene having a density of 0.960 g/cm³ and a melt index of 8 g/10 min.

HDPEC represents a high density linear polyethylene having a density of 0.958 g/cm³ and a melt index of 6.0 g/10 min.

LLDPEA is a linear low density copolymer of ethylene and octene-1 which has a melt index of 1.0 g/10 min and a density of 0.920 g/cm³.

LLDPEB is a linear low density polyethylene copolymer with octene-1 which has a melt index of 2.3 g/10 min and a density of 0.917 g/cm³.

LLDPEC is a linear low density copolymer of ethylene and octene-1 having a density of 0.912 g/cm³ and a melt index of 3.3 g/10 min.

LLDPED is a linear low density copolymer of ethylene and octene-1 having a density of 0.912 g/cm³ and a melt index of 1 g/10 min.

LLDPEE is a linear low density copolymer of ethylene and octene-1 having a density of 0.92 g/cm³ and a melt index of 1.4 g/10 min.

LLDPEF is a linear low density copolymer of ethylene and butene-1 with a density of 0.92 g/cm³ and a melt index of 1.4 g/10 min.

LLDPEG is a linear low density copolymer of ethylene and butene-1 having a density of 0.92 g/cm³ and a melt index of 0.6 g/10 min.

EVOH F is an ethylene/vinyl alcohol copolymer having approximately 32 mole percent ethylene and a melt flow of 3 g/10 min at 210° C.

EVOH E is an ethylene/vinyl alcohol copolymer having approximately 44 mole percent ethylene and a melt flow of 16 g/10 min at 210° C.

CXA represents the melt extrudable bonding resin composition employed to adhere the high density polyethylene to the polar substrate which in these Examples is an ethylene/vinyl alcohol copolymer represented by EVOH, the saponification product of the corresponding ethylene/vinyl acetate copolymer or an amorphous polycarboxylamide which is the reactive product of hexamethylenediamine and a mixture of isophthalic and terephthalic acids.

In Tables II, III and IV, HDPE represents high density polyethylene employed as the nonpolar moisture vapor barrier in the composite film. In these examples this was HDPEA.

GRAFT CODES D, E, G, H, P and S refer to the code set out in Table I for the properties of the HDPE grafted resins.

GRAFT CODE T refers to 2.0% by weight maleic anhydride grafted to EPDM rubber as set out in Table VII.

MVT represents moisture vapor transmission and is employed in Table V with respect to the various compositions set out there. As shown in Table V compositions which are principally HDPE have a low MVT whereas compositions which are LLDPE solely have twice the moisture transmission of HDPE compositions. The compositions of this invention closely approximate the low values of 100% HDPE. These moisture vapor transmission measurements were made on a Mocon Permatian W at 37.8.C at 100% relative humidity. The MVT values were obtained on approximately 5 ml extrusion cast films. The Mocon reading was multiplied by the thickness of the cast film to obtain the value reported in Table V.

CAL % MALEIC is the calculated % maleic anhydride that is in the blend based on the amount of maleic anhydride in the graft and the amount of graft used in the blend.

PEEL kg/cm refers to the peel strength in kg/cm as determined on a 1-inch wide strip cut from the center of the composite film parallel with flow direction and then separated at a rate of 5 inches per minute on a universal testing machine. The samples were generally peeled within 4 hours after having been made.

In Examples 1-42 the adhesive blends were prepared by dry blending the ingredients together by tumbling in a polyethylene bag followed by melt blending in a 30 mm Werner Pfleiderer extruder which had two sets of kneading blocks and three reverse bushings. The vacuum port was maintained at 20 inches vacuum. Extruder barrel temperatures were set at 180° C., rpm was 200 and the extrusion rate was 20 lbs per hour. The melt exiting the extruder was quenched in water and then cut into molding pellets. Included in the blends of Examples 1-42 was 0.1% of a hindered phenolic antioxidant either Irganox 1010 (referred to as "10" in the Tables) or Irganox 1076 (referred to as "76" in the Tables).

The blends were then evaluated as the coextruded middle adhesive tie layer between a coextrusion of an ethylene vinyl alcohol copolymer (EVOH) and a high density polyethylene, HDPEA. Each of the graft modified polyethylene blend compositions listed in Tables I-III was melted in a one inch extruder at 4-6 rpm and the molten extrudate from that extruder was fed to a coextrusion die and formed the innermost central layer. The molten outer layer of EVOH was fed to the coextrusion die by a 1.5 inch extruder operating at approximately 10 rpm. The outer layer of HDPE was fed as a melt to the coextrusion die by a 1.25 inch extruder operating at approximately 15 rpm. The barrel temperatures of all extruders were set at 230° C. and the melt temperatures indicated by a melt thermocouple in the die was 233 C. The composite film emerging from the die was wrapped around a heated drum which was at a temperature of approximately 100° C. The film width was 0.28 meter. The film take-up speed was 1.52 meters/min. The film thicknesses of each layer of the composite structure are indicated in Tables II, III, IV and VI.

Table I lists the melt index and density of the grafted HDPE polymers used in Tables II-VII.

In Tables II-VI the heading "Graft Code" refers to the code set out in Table I for the grafted high density linear polyethylene having maleic anhydride grafted onto it.

Referring to the Examples as set out in Table II, Comparison Example 1 had a low peel strength because the melt index of the graft ("S") was above the maximum permitted by the invention. In Table III, Comparison Examples 2-5 had low peel strengths because they contained inadequate amounts of the LLDPE component. Comparison Example 6 had a low peel strength because again it employed a graft ("S") having too high a melt flow. In Table IV, Comparison Example 7 is primarily all LLDPEA; while its peel strength is in a low range of the preferred HDPE blends, its moisture vapor transmission rate (MVT) was too high and therefore not within the invention. Comparison Examples 8 and 9 have low peel strengths because there was insufficient amount of maleic anhydride in the final blend.

TABLE I

| PROPERTIES OF HDPE GRAFTED RESINS | | |
|---|---|---|
| Code | Density | Melt Index |
| D | 0.960 | 5.47 |
| E | 0.956 | 0.80 |
| G | 0.960 | 1.40 |
| H | 0.956 | 0.85 |
| P | 0.960 | 2.49 |
| S | 0.960 | 12.50 |

TABLE II

| EXAMPLES 1-9 AND COMPARATIVE EXAMPLE 1 | | | | | | | | | | |
|---|---|---|---|---|---|---|---|---|---|---|
| Patent Example | HDPE Type | LLDPE Type | LLDPE % | Graft Code | Graft % | CAL % Maleic | EVOH F mm Thick | CXA mm Thick | HDPE mm Thick | Peel kg/cm | Anti Oxidant |
| Comp 1 | HDPEA | LLDPEB | 20 | S | 15.0 | 0.150 | 0.091 | 0.028 | 0.089 | 0.08 | I10 |
| Ex 1 | HDPEA | LLDPEB | 20 | H | 9.5 | 0.095 | 0.099 | 0.020 | 0.112 | 0.58 | I10 |
| Ex 2 | HDPEA | LLDPEB | 20 | P | 18.3 | 0.165 | 0.102 | 0.020 | 0.112 | 0.51 | I76 |
| Ex 3 | HDPEA | LLDPEB | 20 | P | 14.6 | 0.131 | 0.102 | 0.020 | 0.112 | 0.47 | I76 |
| Ex 4 | HDPEA | LLDPEB | 12 | P | 18.3 | 0.165 | 0.102 | 0.020 | 0.107 | 0.40 | I76 |
| Ex 5 | HDPEA | LLDPEB | 12 | P | 14.6 | 0.131 | 0.099 | 0.023 | 0.117 | 0.34 | I76 |
| Ex 6 | HDPEB | LLDPEB | 20 | E | 20.0 | 0.120 | 0.102 | 0.020 | 0.107 | 0.72 | I10 |
| Ex 7 | HDPEB | LLDPEB | 20 | D | 24.0 | 0.120 | 0.086 | 0.016 | 0.117 | 0.68 | I10 |
| Ex 8 | HDPEB | LLDPEB | 20 | H | 12.0 | 0.120 | 0.086 | 0.019 | 0.117 | 0.71 | I10 |

TABLE II-continued

EXAMPLES 1-9 AND COMPARATIVE EXAMPLE 1

| Patent Example | HDPE Type | LLDPE Type | LLDPE % | Graft Code | Graft % | CAL % Maleic | EVOH F mm Thick | CXA mm Thick | HDPE mm Thick | Peel kg/cm | Anti Oxidant |
|---|---|---|---|---|---|---|---|---|---|---|---|
| Ex 9 | HDPEB | LLDPEB | 20 | D | 24.0 | 0.120 | 0.107 | 0.021 | 0.132 | 0.44 | I10 |

TABLE III

EXAMPLES 10-17 AND COMPARATIVE EXAMPLES 2-6

| Patent Example | HDPE Type | LLDPE Type | LLDPE % | Graft Code | Graft % | CAL % Maleic | EVOH F mm Thick | CXA mm Thick | HDPE mm Thick | Peel kg/cm | Anti Oxidant |
|---|---|---|---|---|---|---|---|---|---|---|---|
| Comp 2 | HDPEA | LLDPEA | 5 | P | 14.6 | 0.131 | 0.066 | 0.025 | 0.140 | 0.25 | I10 |
| Comp 3 | HDPEA | NONE | 0 | P | 21.9 | 0.197 | 0.076 | 0.018 | 0.142 | 0.22 | I10 |
| Comp 4 | HDPEA | LLDPEB | 5 | P | 14.6 | 0.131 | 0.071 | 0.025 | 0.122 | 0.21 | I10 |
| Comp 5 | HDPEA | NONE | 0 | P | 14.6 | 0.131 | 0.089 | 0.023 | 0.122 | 0.16 | I10 |
| Comp 6 | HDPEA | LLDPEB | 20 | S | 14.6 | 0.161 | 0.071 | 0.020 | 0.117 | 0.12 | I10 |
| Ex 10 | HDPEA | LLDPEB | 30 | P | 14.6 | 0.131 | 0.069 | 0.015 | 0.122 | 0.89 | I10 |
| Ex 11 | HDPEA | LLDPEB | 10 | P | 14.6 | 0.131 | 0.097 | 0.020 | 0.137 | 0.29 | I10 |
| Ex 12 | HDPEA | LLDPEB | 20 | P | 14.6 | 0.131 | 0.071 | 0.018 | 0.130 | 0.51 | I10 |
| Ex 13 | HDPEA | LLDPEA | 30 | P | 14.6 | 0.131 | 0.076 | 0.023 | 0.124 | 0.50 | I10 |
| Ex 14 | HDPEA | LLDPEB | 20 | P | 7.3 | 0.066 | 0.081 | 0.020 | 0.122 | 0.45 | I10 |
| Ex 15 | HDPEA | LLDPEB | 20 | P | 21.9 | 0.197 | 0.071 | 0.020 | 0.112 | 0.45 | I10 |
| Ex 16 | HDPEA | LLDPEA | 20 | P | 14.6 | 0.131 | 0.084 | 0.020 | 0.145 | 0.40 | I10 |
| Ex 17 | HDPEA | LLDPEA | 10 | P | 14.6 | 0.131 | 0.086 | 0.020 | 0.107 | 0.38 | I10 |

TABLE IV

EXAMPLES 18-22 AND COMPARATIVE EXAMPLES 7-9

| Patent Example | HDPE Type | LLDPE Type | LLDPE % | Graft Code | Graft % | CAL % Maleic | EVOH F mm Thick | CXA mm Thick | HDPE mm Thick | Peel kg/cm | Anti Oxidant |
|---|---|---|---|---|---|---|---|---|---|---|---|
| Comp 7 | NONE | LLDPEA | 85.4 | P | 14.6 | 0.131 | 0.086 | 0.021 | 0.112 | 0.47 | I10 |
| Comp 8 | HDPEA | LLDPEB | 30.0 | P | 3.3 | 0.030 | 0.091 | 0.021 | 0.112 | 0.06 | I10 |
| Comp 9 | HDPEA | LLDPEB | 30.0 | P | 5.6 | 0.050 | 0.097 | 0.020 | 0.127 | 0.20 | I10 |
| Ex 18 | HDPEA | LLDPEA | 20.0 | P | 14.6 | 0.131 | 0.102 | 0.020 | 0.127 | 0.36 | I10 |
| Ex 19 | HDPEA | LLDPEB | 20.0 | D | 22.0 | 0.110 | 0.107 | 0.020 | 0.142 | 0.56 | I10 |
| Ex 20 | HDPEA | LLDPEB | 30.0 | P | 14.6 | 0.131 | 0.086 | 0.020 | 0.127 | 0.78 | I10 |
| Ex 21 | HDPEA | LLDPEB | 45.0 | P | 14.6 | 0.131 | 0.081 | 0.020 | 0.142 | 0.78 | I10 |
| Ex 22 | HDPEA | LLDPEB | 20.0 | P | 14.6 | 0.131 | 0.102 | 0.018 | 0.142 | 0.64 | I10 |

TABLE V

EXAMPLES 23-30 & COMPARATIVE EXAMPLES 10-25

| Patent Example | Base Resin | LLDPE Type | LLDPE % | Graft Code | MVT g mm/M$^2$/24 HR |
|---|---|---|---|---|---|
| Comp 10 | HDPEA | | | | 0.138 |
| Comp 11 | HDPEA | | | | 0.104 |
| Comp 12 | LLDPEA | | | | 0.273 |
| Comp 13 | LLDPEA | | | | 0.276 |
| Ex 23 | HDPEA | LLDPEA | 9 | D | 0.132 |
| Comp 14 | HDPEA | LLDPEA | 24 | S | 0.162 |
| Comp 15 | HDPEA | LLDPEA | 20 | | 0.145 |
| Ex 24 | HDPEA | LLDPEA | 20 | G | 0.158 |
| Ex 25 | HDPEA | LLDPEA | 20 | G | 0.154 |
| Ex 26 | HDPEA | LLDPEA | 20 | D | 0.160 |
| Ex 27 | HDPEA | LLDPEA | 20 | D | 0.162 |
| Ex 28 | HDPEA | LLDPEB | 8 | G | 0.139 |
| Ex 29 | HDPEA | LLDPEB | 12 | G | 0.152 |
| Ex 30 | HDPEA | LLDPEB | 20 | G | 0.160 |

It is to be understood that the absolute values of the peel strengths set out in the above Examples are dependent upon the conditions under which the coextruded composite film structures were made, upon the method and rate of testing the peel strength and the thicknesses of the individual foils making up the composite film structure and therefore cannot readily be compared with peel strengths of such composite structures made under other conditions.

EXAMPLES 31-42

The composite film structures of Examples 31-42 were prepared in the same fashion as described for the composite film structures of Examples 1-30. However, in these Examples the composition of the bonding resin was varied by varying the type of LLDPE as shown in Table VI.

In Table VI the heading "Struct Type" refers to the type of HDPE used as the moisture barrier foil in the composite film structure. The heading "Bar Type" TM refers to the type of EVOH employed.

TABLE VI

EXAMPLES 31–42

| Patent Example | HDPE Type | LLDPE Type | LLDPE % | Graft Code | Graft % | CAL % Maleic | EVOH mm Thick | CXA mm Thick | HDPE mm Thick | Bar Type | Struct Type | Peel kg/cm |
|---|---|---|---|---|---|---|---|---|---|---|---|---|
| Ex 31 | HDPEA | LLDPEB | 20 | P | 6.1 | 0.099 | 0.094 | 0.023 | 0.152 | F | HDPEA | 0.91 |
| Ex 32 | HDPEA | LLDPEB | 20 | P | 12.2 | 0.050 | 0.117 | 0.025 | 0.163 | F | HDPEA | 1.16 |
| Ex 33 | HDPEA | LLDPEC | 20 | P | 12.2 | 0.055 | 0.127 | 0.025 | 0.163 | F | HDPEA | 0.77 |
| Ex 34 | HDPEA | LLDPED | 20 | P | 12.2 | 0.110 | 0.132 | 0.028 | 0.168 | F | HDPEA | 0.65 |
| Ex 35 | HDPEA | LLDPEE | 20 | P | 12.2 | 0.110 | 0.117 | 0.028 | 0.163 | F | HDPEA | 0.28 |
| Ex 36 | HDPEA | LLDPEE | 28 | P | 12.2 | 0.110 | 0.086 | 0.023 | 0.173 | F | HDPEA | 0.71 |
| Ex 37 | HDPEA | LLDPEF | 20 | P | 12.2 | 0.110 | 0.107 | 0.025 | 0.152 | F | HDPEA | 0.75 |
| Ex 38 | HDPEA | LLDPEF | 28 | P | 12.2 | 0.110 | 0.097 | 0.025 | 0.152 | F | HDPEA | 1.07 |
| Ex 39 | HDPEA | LLDPEG | 20 | P | 12.2 | 0.110 | 0.112 | 0.025 | 0.152 | F | HDPEA | 0.88 |
| Ex 40 | HDPEA | LLDPEG | 28 | P | 12.2 | 0.110 | 0.094 | 0.025 | 0.157 | F | HDPEA | 0.93 |
| Ex 41 | HDPEB | LLDPEB | 20 | P | 12.2 | 0.110 | 0.091 | 0.025 | 0.107 | E | HDPEB | 0.54 |
| Ex 42 | HDPEB | LLDPEB | 20 | P | 12.2 | 0.110 | 0.069 | 0.020 | 0.086 | E | HDPEB | 0.87 |

As can be seen from Table VI, Examples 38, 39 and 40, LLDPE made from ethylene/butene-1 copolymer is equally effective as ethylene/octene-1 copolymer for this component.

COMPARATIVE EXAMPLES 43, 44 AND EXAMPLE 45

Examples 43, 44 and 45 illustrate the preparation of blown bottles having a composite structure; Example 45 has the composite structure of this invention. Comparative Examples 43 and 44 illustrate other composite structure bottles where adhesion was not satisfactory. The preparation of these bottles involved coextrusion of a parison having high density polyethylene on the outside and an amorphous polycarboxylamide prepared from the condensation product of hexamethylenediamine and a mixture of 30% terephthalic acid and 70% isophthalic acid on the inside, with melt extrudable bonding compositions between the two layers.

The conditions for extruding the parisons and blowing the bottles for Example 45 were as follows:

The amorphous polycarboxylamide was extruded from a 50 mm single screw extruder whose set temperatures was 221.C to 227 C except for the feed section which was 93 C. The HDPE was fed from 50 mm single screw extruder with 177° C. to 193° C. barrel temperature except for the feed section which was at approximately 66° C. The extruder for the coextrudable adhesive was a 38 mm single screw extruder. Barrel temperatures were 177.C to 232.C except for the feed section which was set at approximately 66.C. These extruders formed the multilayer parison with the polyamide on the inside and the HDPE on the outside. The parison was blown into 32 oz Boston round cylindrical bottles with a weight of 40±0.3 g. The HDPE layer of the bottle was 0.36 to 0.41 mm thick, the adhesive layer was 0.05 to 0.08 mm thick and the copolyamide layer was 0.08 to 0.10 mm thick. The cycle time per bottle was 14 seconds.

The parisons were blown into a mold which provided 32 oz. Boston round cylindrical plastic bottles having a weight of 40±3 g. The HDPE used as outer layer of the composite structure of the bottle was HDPEC. HDPEC is a high density linear ethylene. The polycarboxylamide layer provides excellent oxygen barrier properties while the HDPE layer provides excellent moisture vapor barrier properties. In Example 45, the middle layer of the bonding resin composition provided both excellent adhesion and high MVT resistance. Similar conditions were used to prepare the composite bottles of Comparison Examples 43 and 44. In Comparison Examples 43 and 44, the bonding resins were ethylene/vinyl acetate copolymer blended with EPDM rubber having maleic anhydride grafted to it and which failed to give the high peel strength provided by a bonding resin composition of the present invention. The compositions of Examples 43, 44 and 45 are set out in Table VII.

The peel strengths in the machine direction (MD) and the transverse direction (TD) were measured by cutting one inch wide strips in those two directions from the blown bottles and then measured as described for the peel strength measurements in Examples 1–42.

TABLE VII

COEXTRUDED COMPOSITE STRUCTURE BOTTLES

| Patent Example | HDPE Type | LLDPE Type | LLDPE % | Graft Code | Graft Wt. % | CAL % Maleic | PCA** mm Thick | CXA mm Thick | HDPE mm Thick | Peel Strength kg/mm MD | TD |
|---|---|---|---|---|---|---|---|---|---|---|---|
| Comp. Ex 43 | (1) | — | — | T | 10 | 0.2 | 0.08–0.10 | 0.05–0.08 | 0.36–0.41 | 0.18 | 0.30 |
| Comp. Ex 44 | (2) | — | — | T | 5 | 0.1 | 0.08–0.10 | 0.05–0.08 | 0.36–0.41 | 0.16 | 0.16 |
| Ex 45 | HDPEC | LLDPEB | 20% | P | 14 | 0.126 | 0.08–0.10 | 0.05–0.08 | 0.36–0.41 | CNS* | CNS* |

*CNS = Could not separate.
**PLA = Amorphous polycarboxylamide, 70/30 6I/6T.
(1) Copolymer of ethylene with 18% vinyl acetate having a melt index of 2.5 g/10 min.
(2) Copolymer of ethylene with 9.5% vinyl acetate having a melt index of 0.8 g/10 min.

A further test was made on the bottles of Examples 43 and 45. In this test the bottles were filled four-fifths of the way to the top with a mixture of 80% xylenes and 20% cyclohexanol. The bottles were stoppered and placed in an oven at 60° C. and the peel strength measured after various exposure times up to 100 hours. Table VIII sets out peel strength data for these bottles. It is evident that the bottle of Example 45 was particularly outstanding in that even after 100 hours of this test the HDPE and polycarboxylamide layers could not be separated.

TABLE VIII

PEEL STRENGTH AFTER EXPOSURE OF
80% XYLENE/20% CYCLOHEXAMINE AT 60° C.

| Exposure Time | Peel Strength (MD) kg/mm | |
|---|---|---|
| hours | Comp. Example 43 | Example 45 |
| 0 | 0.18 | CNS* |
| 8 | 0.12 | CNS |
| 24 | 0.08 | CNS |
| 100 | 0.17 | CNS |

*CNS = could not be separated.

Depending upon the intended use of the coextruded bottle, the amorphous polycarboxylamide layer can form either the inside or the outside layer of the composite structure bottle of Example 45; this can be accomplished by extruding the parison with the polycarboxylamide on the outside and the HDPE on the inside with the bonding resin between and then blowing the parison into the mold. Similarly, other oxygen barrier resins can be substituted for the amorphous polycarboxylamide of Example 45. If desired, multiple layer composite bottles can be made in accord with the invention, for example by extruding a parison with HDPE on both the inside and the outside with an oxygen barrier resin in between which is adhered on both sides of the HDPE with layers of an extrudable bonding resin of this invention when the parison is blown into the bottle.

I claim:

1. A melt-extrudable bonding resin composition capable of adhering nonpolar high density linear polyethylene in the form of foils, sheets, tubes or blown bottles to polar oxygen barrier resins in the form, respectively, of foils, sheets, tubes or blown bottles which exhibits a combination of resistance to separation of said nonpolar high density polyethylene from said polar oxygen barrier resins and low moisture vapor transmission, said bonding resin composition consisting essentially of a blend of from 70 to 90 weight percent of composition (i) and from 10 to 30 weight percent of composition (ii) wherein composition (i) is composed of a blend of high density linear polyethylene having a melt index in the range of 0.1 to 8.0 g/10 min and a density in the range of from above 0.950 to 0.970 g/cm$^3$ and sufficient of a high density linear polyethylene having a melt index in the range of 0.1 to 8.0 g/10 min and a density in the range of 0.950 to 0.970 g/cm$^3$ having from 0.7 to 14 mole percent of maleic anhydride grafted to said high density linear polyethylene to provide from 0.245 to 1.05 mole percent of said grafted maleic anhydride in said composition (i), wherein composition (ii) is a linear low density polyethylene selected from the group consisting of linear copolymers of ethylene with butene-1 and linear copolymers of ethylene with octene-1 having a density in the range of 0.912 to 0.930 g/cm$^3$ and a melt index in the range of 0.5 to 3.35 g/10 min.

2. The bonding resin of claim 1 in which composition (i) comprises 80 to 90 weight percent and composition (ii) comprises 10 to 20 weight percent of the bonding resin.

3. The bonding resin of claim 2 in which the linear low density polyethylene of composition (ii) is a copolymer of ethylene and octene-1.

4. The bonding resin of claim 2 in which the linear low density polyethylene of composition (ii) is a copolymer of ethylene and butene-1.

* * * * *